United States Patent [19]

Ogle et al.

[11] Patent Number: 5,313,638
[45] Date of Patent: May 17, 1994

[54] METHOD USING SEMAPHORES FOR SYNCHRONIZING COMMUNICATION BETWEEN PROGRAMS OR PROCESSES RESIDENT IN A COMPUTER SYSTEM

[75] Inventors: David M. Ogle, Cary; Earl H. Williams, Jr., Durham, both of N.C.

[73] Assignee: International Business Machines Corp., Armonk, N.Y.

[21] Appl. No.: 856,793

[22] Filed: Mar. 24, 1992

[51] Int. Cl.$^5$ .................... G06F 9/46; G06F 13/00
[52] U.S. Cl. .................... 395/725; 364/DIG. 1;
364/228.1; 364/241.7; 364/264.5; 364/264.6;
364/280; 364/271; 395/700; 395/325
[58] Field of Search ............ 395/200, 650, 700, 325,
395/725

[56] References Cited

U.S. PATENT DOCUMENTS

| | | | |
|---|---|---|---|
| 4,374,409 | 2/1983 | Bienvenu et al. | 364/DIG. 1 |
| 5,036,459 | 7/1991 | den Haan et al. | 364/DIG. 1 |
| 5,109,515 | 4/1992 | Laggis et al. | 395/725 |
| 5,133,053 | 7/1992 | Johnson et al. | 395/200 |

*Primary Examiner*—Eddie P. Chan

[57] ABSTRACT

A communication method suitable for use between programs operating at different privilege levels in a processor utilizes shared memory which includes a plurality of memory slots for containing messages to be exchanged and message queue. The synchronization of the programs and access to the shared memory is controlled a number of semaphores. Each slot is provided with its own semaphore ana three additional semaphores are provided to synchronize operation.

11 Claims, 7 Drawing Sheets

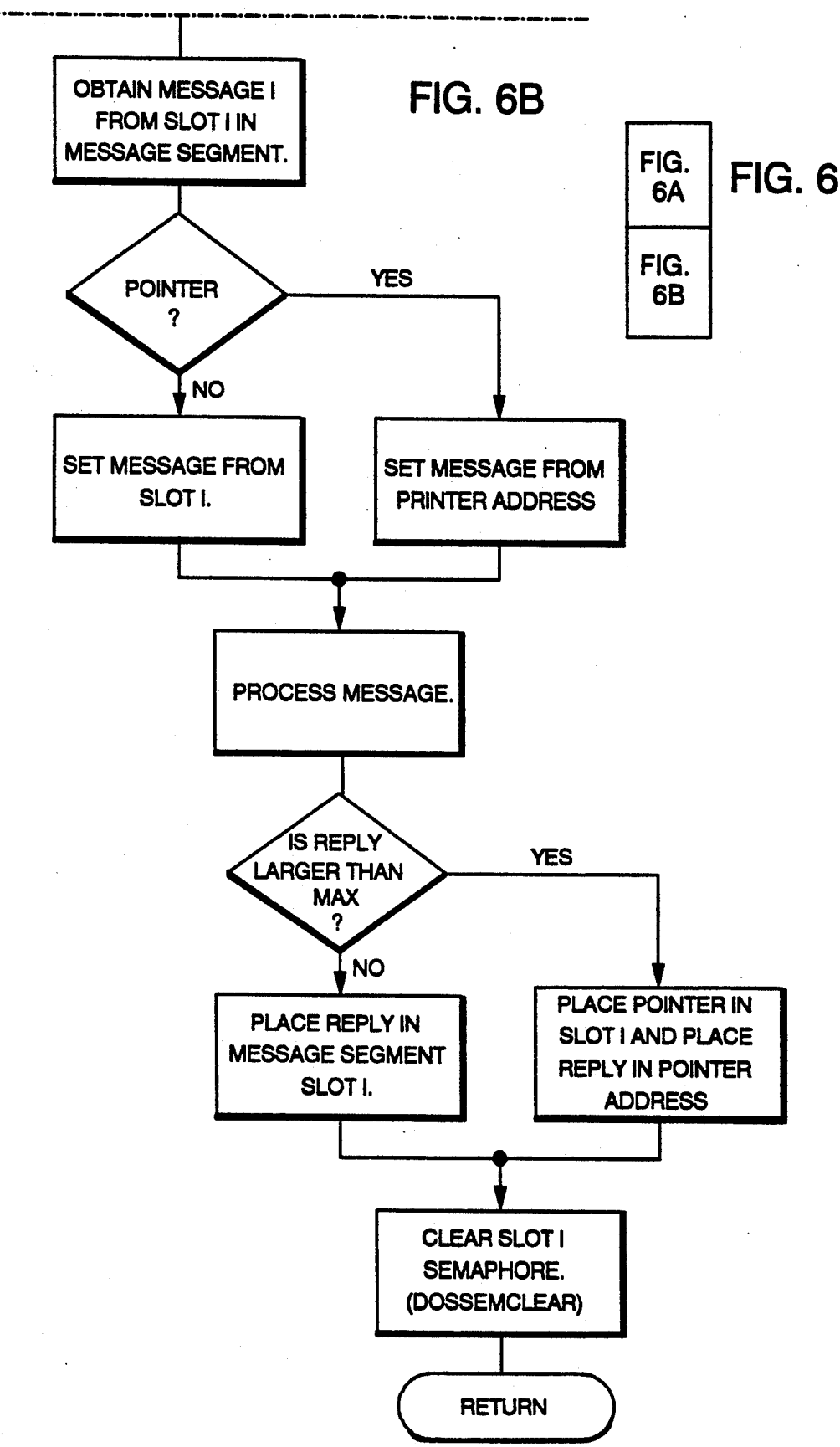

METHOD USING SEMAPHORES FOR SYNCHRONIZING COMMUNICATION BETWEEN PROGRAMS OR PROCESSES RESIDENT IN A COMPUTER SYSTEM

FIELD OF THE INVENTION

The invention relates to a method of communication between processes resident in a computer or a data processing system.

BACKGROUND OF THE INVENTION

Most computer operating systems provide different privilege or priority levels for different functions performed by software. In the IBM OS/2 operating system, file management functions are most effectively performed at the highest priority level (ring zero) while application (user programs) operate at a lower priority level (ring 3). Under ordinary circumstances this poses no significant problem. However, kernel programs, operating at ring zero, can not communicate directly with externally located programs such as remote file server programs.

When porting an existing file server system such as the Andrews File Server (AFS) to run on the OS/2 system this limitation imposed operational restrictions since file operation requests from an application level program (ALP) to a file driver kernel level program (KLP) most often required communications with the remote file server.

An obvious solution was to provide a cache manager program operating at the application level in communication with the kernel level file driver program to support remote communications with the file server program. This solution, however, adversely impacts performance when existing communication methods are used for this purpose. An alternative method for this communication is needed if performance is not to be adversely impacted.

SUMMARY OF THE INVENTION

The invention contemplates a method for interprocess communication in which a plurality of memory segments and a queue are shared by the processes each of which can include concurrently operating threads. Each memory segment has associated with it a semaphore which has two states (set and clear). In addition, a message, queue and wakeup semaphore are provided to synchronize operation so that only one thread can have access to selected portions of the inter-process communication at a time.

In operation the sending process obtains an available segment by requesting a message semaphore. The operating system returns the message semaphore and the sending process selects an index of the allocated segment and the process placed the message in the the memory segment indicated by the index. It then requests the queue semaphore from the operating system. Upon return of the queue semaphore the index of the segment is added to the queue and the segment semaphore associated with the segment index is set. At this time the sending process clears the message, queue and wakeup semaphores and waits for the segment semaphore to be cleared which will occur when the receiving process has placed a reply message in the selected memory segment. After the message segment semaphore is cleared the sending process completes its action with respect to the response and frees the message segment for use by another thread of the process.

When the wakeup semaphore is cleared the receiving process requests the queue semaphore (to prevent other threads from accessing the queue), removes the index of the first message from the queue, clears the queue semaphore and obtains the message from the the message segment indicated by the index. It processes the message (obtains a file etc locally or from a remote database), places the reply in the message segment indicated by the index and clears the the message segment semaphore on which the sending process was blocking.

BRIEF DESCRIPTION OF THE DRAWINGS

FIG. 3, comprising

FIG. 6A and 6B, is a flow chart illustrating the operation of the cache manager program.

DESCRIPTION OF THE PREFERRED EMBODIMENTS

Figure 1:
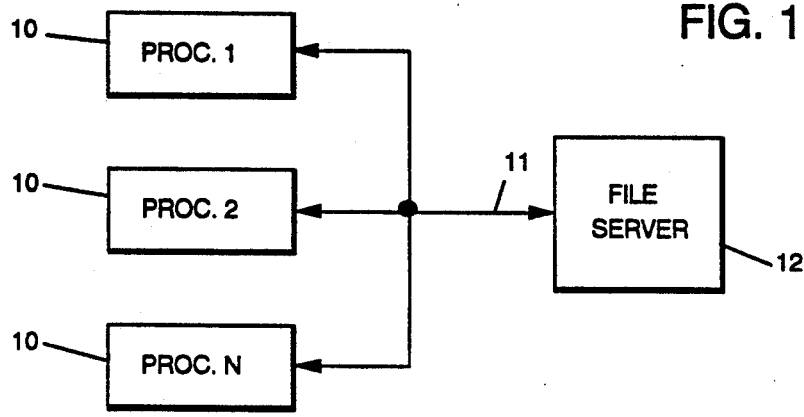
FIG. 1 is block diagram of a distributed processing system served by a remote file server.

In FIG. 1 a plurality of distributed processors 10 are connected to a remote file server 12 by a local area network 11. The processors 10 may have concurrent read or write file requests which involve access to the file server 12.

Figure 2:
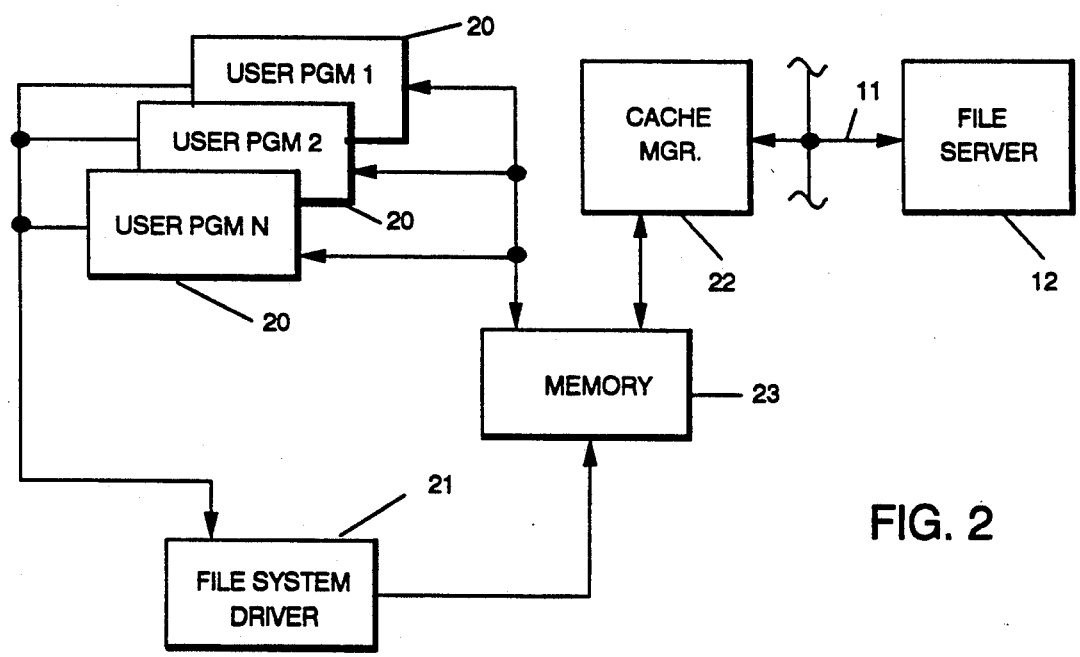
FIG. 2 is a block diagram of the different programs involved in practicing the invention.

In FIG. 2 a single processor 10 is shown connected to the file server 12 by the local area network 11. A plurality of user programs 20 operating at the application (ring 3) level communicate with a file system driver program 21 operating at the kernel (ring 0) level in order to access files. A cache manager program 22 operating at the application (ring 3) level communicates with the file system driver 21 through a shared portion of a memory 23. File requests from the user programs 20 are sent to the file system driver 21 which passes them on to the cache manager 22 through the shared portion of the memory 23.

The portion of memory 23 shared by the file system driver 21 and the cache manager 22 includes n segments used for containing the file system requests and responses, a semaphore associated with each segment, a queue, a message semaphore, a queue semaphore and a wakeup semaphore. The method described herein will work with any operating system which supports shared memory and semaphores such as the IBM OS/2 operating system.

When the file system driver receives a file request from a user program it requests the message semaphore from the operating system. When the message semaphore is returned the file system driver selects a vacant segment or slot in the shared memory 23 and places the message or file request in the slot. It then requests the queue semaphore. When the queue semaphore is received the file system driver adds the index (address) of the selected slot to the queue and set the slot semaphore corresponding to the selected slot. The above steps complete the setup of the message in the shared memory. The message and queue semaphore requests prevent other file system requests from gaining access during this setup process. At this time the file system driver clears the message, queue and wakeup semaphores and blocks on the selected slot semaphore which will be reset by the cache manager when the file request is processed.

When the wakeup semaphore is cleared the cache manager 22 unblocks and requests the queue from the operating system, removes the index (address) of the first message and clears the queue semaphore. It reads the message at the index and processes the same. This could include communication over the local area network 11 with the file server 12. Once the request or message is processed it places the reply in the same slot from which the request was received and clears the associate slot semaphore. When the slot semaphore is cleared the file system driver 21 unblocks, processes the response (responds to the application program) and the clearing of the slot semaphore makes that slot available to handle another file system request.

While the slots can be used to move data to and from the file server it may be desirable in those instances where large files are involved to include in the slot only information sufficient to allow the cache manager to move file data into and out of the application buffer space. This technique reduces the number of copies in memory. Alternatively, a hybrid technique may be used in which file requests which involve data transfers of x bytes or less are processed through the shared memory and transfers over x bytes are transferred by passing the information necessary to move the data into or out of the user application buffer space in the memory.

Figure 3A:
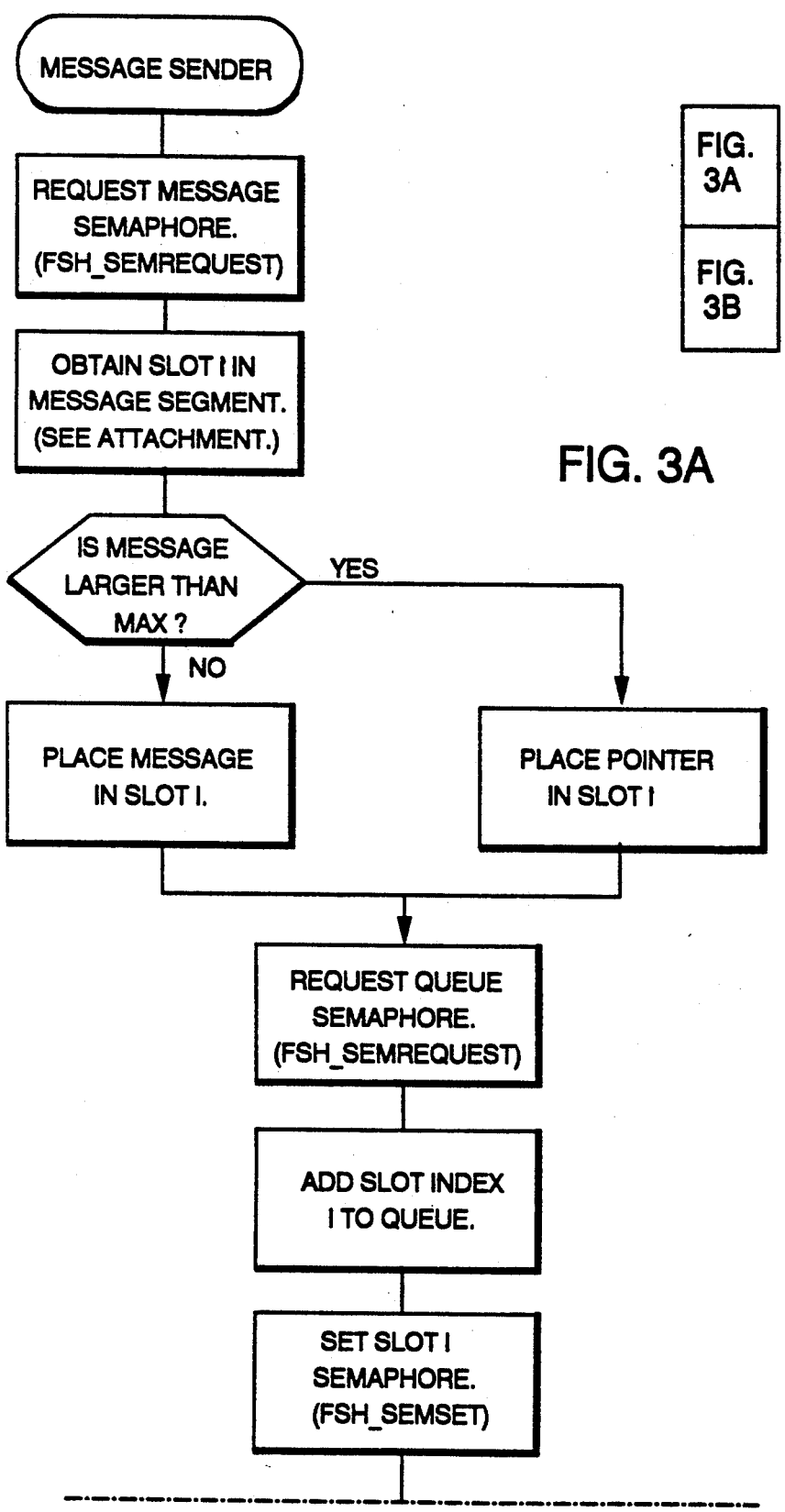
FIG. 3A and 3B, is a flow chart illustrating the operation of the file system driver program.
Figure 3B:
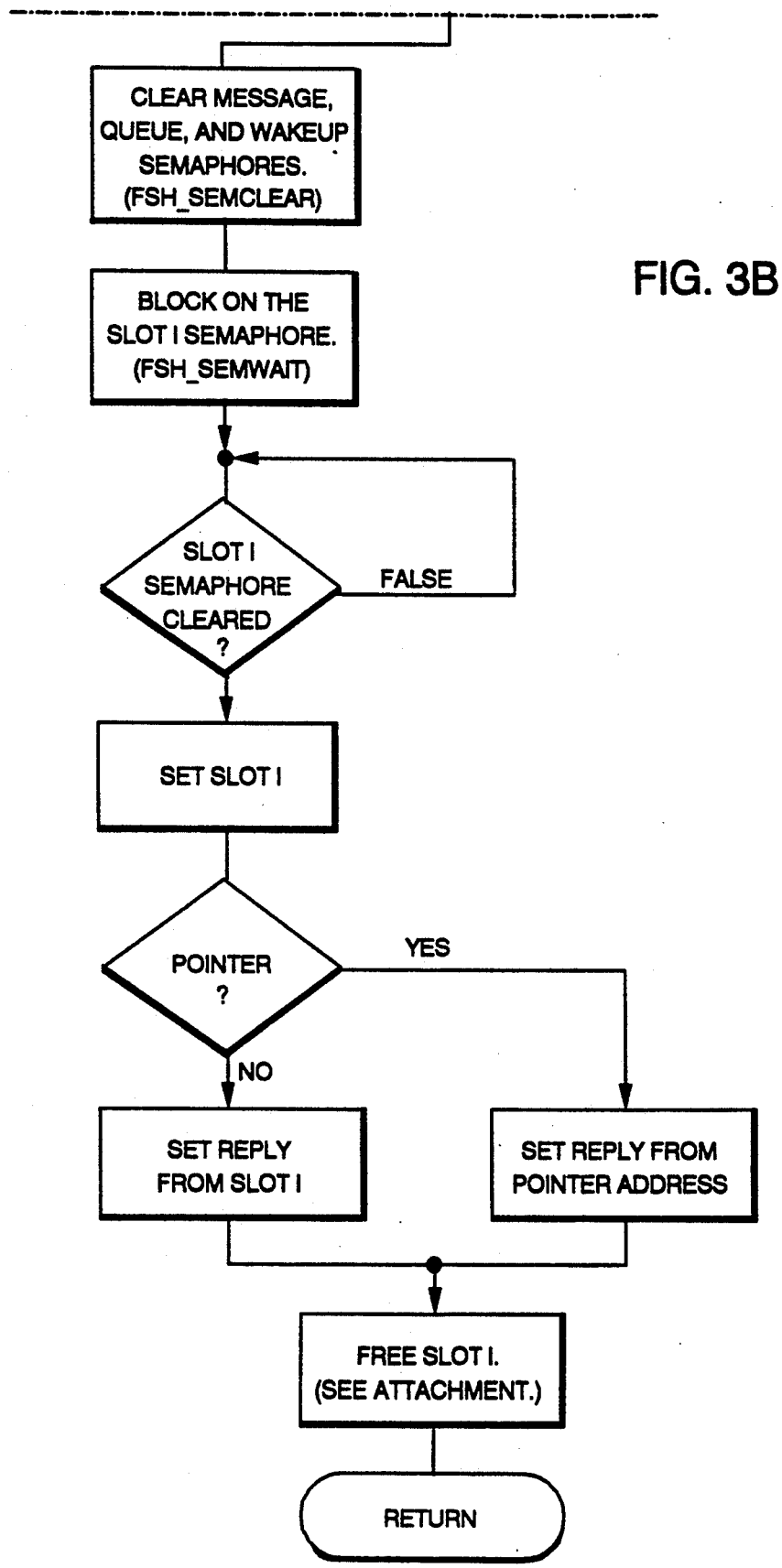
Figure 4:
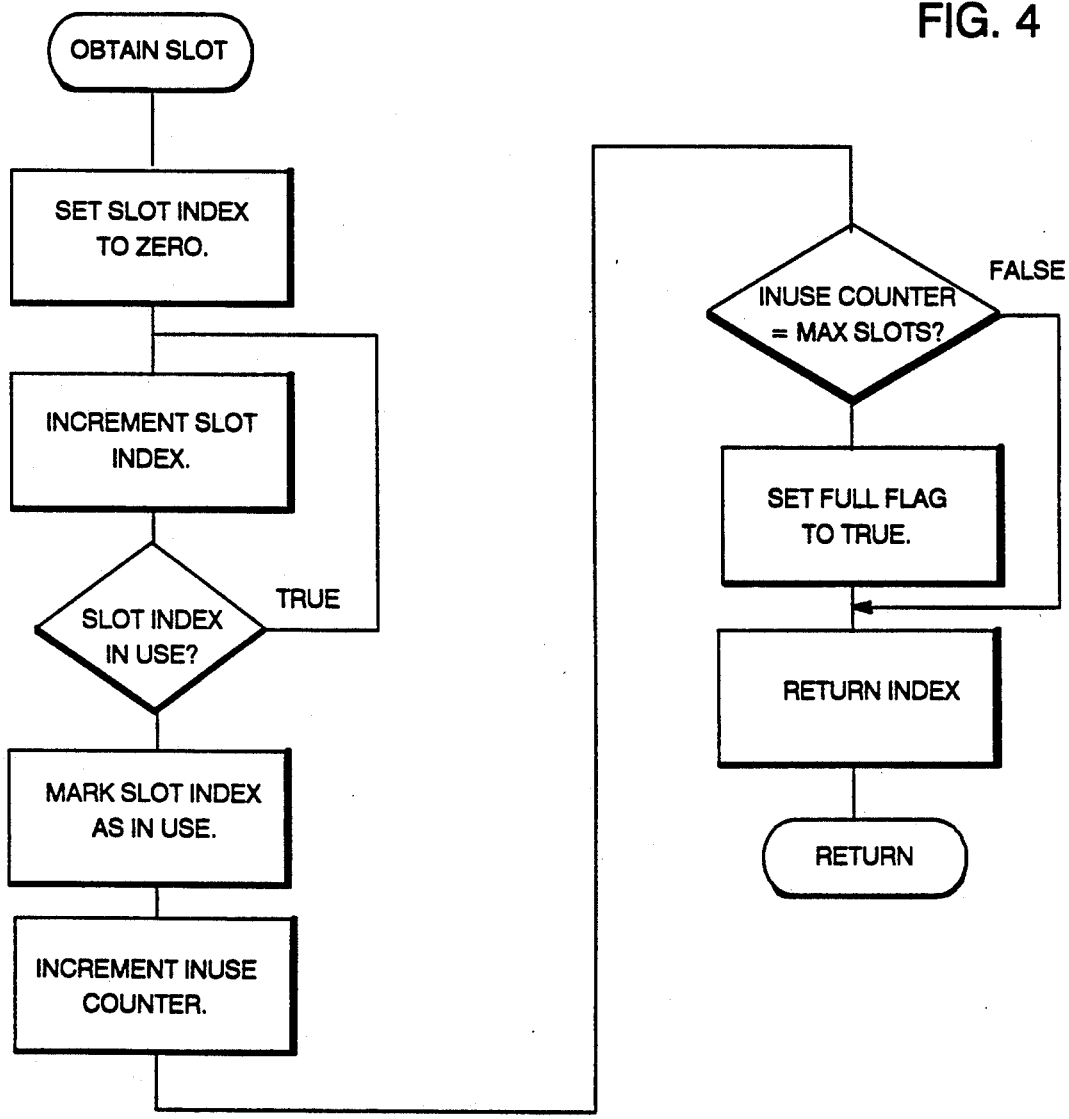
FIG. 4 is a flow chart illustrating how the sending process obtains a message slot in the memory.
Figure 5:
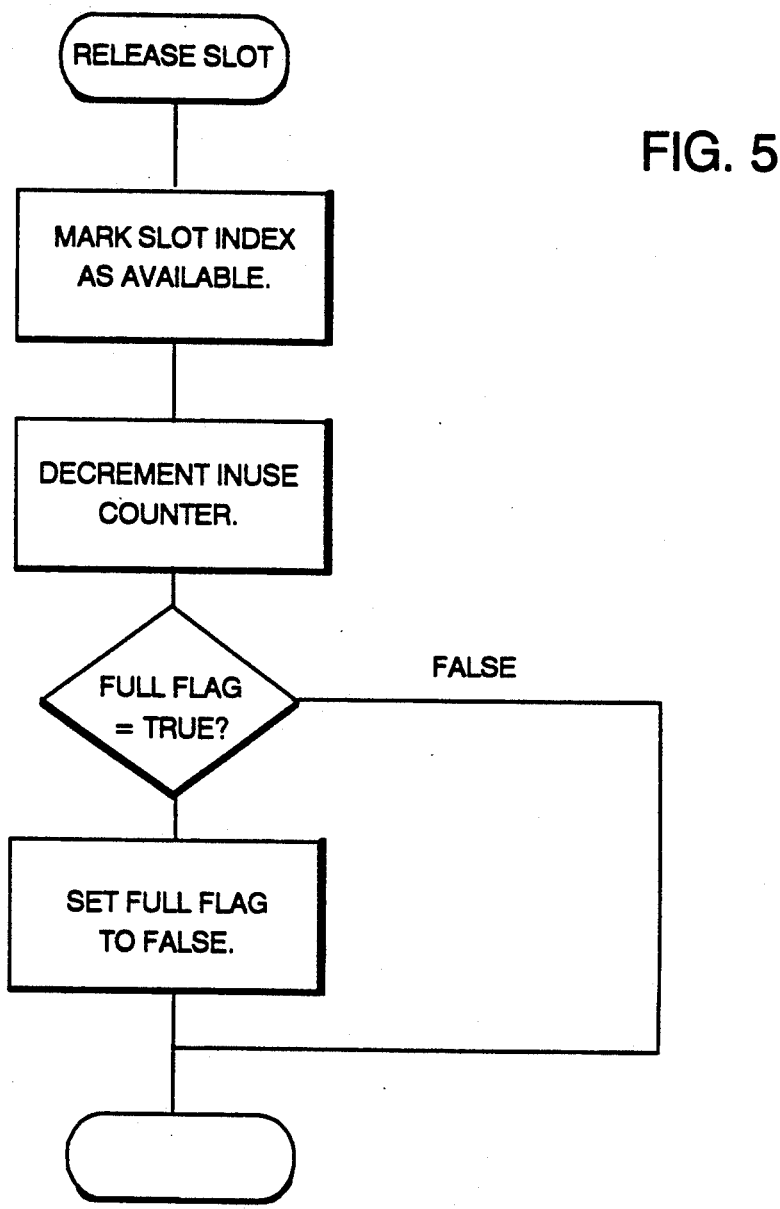
FIG. 5 is a flow chart illustrating how a slot in memory is released once the message stored therein has been processed and, FIG. 6, comprising

The steps described above which are performed by the file system driver 21 are illustrated in the flow diagram of FIG. 3. The OS/2 operating system calls (FSH_SEMREQUEST) for the message and queue semaphores differ only in the parameters included in the call. The flow diagram illustrated in FIG. 4 sets forth that portion of the file system driver program which selects the next available message slot in the shared memory. The flow diagram illustrated in FIG. 5 sets forth that portion of the file system driver program which releases a slot once the message contained therein has been processed.

Figure 6A:
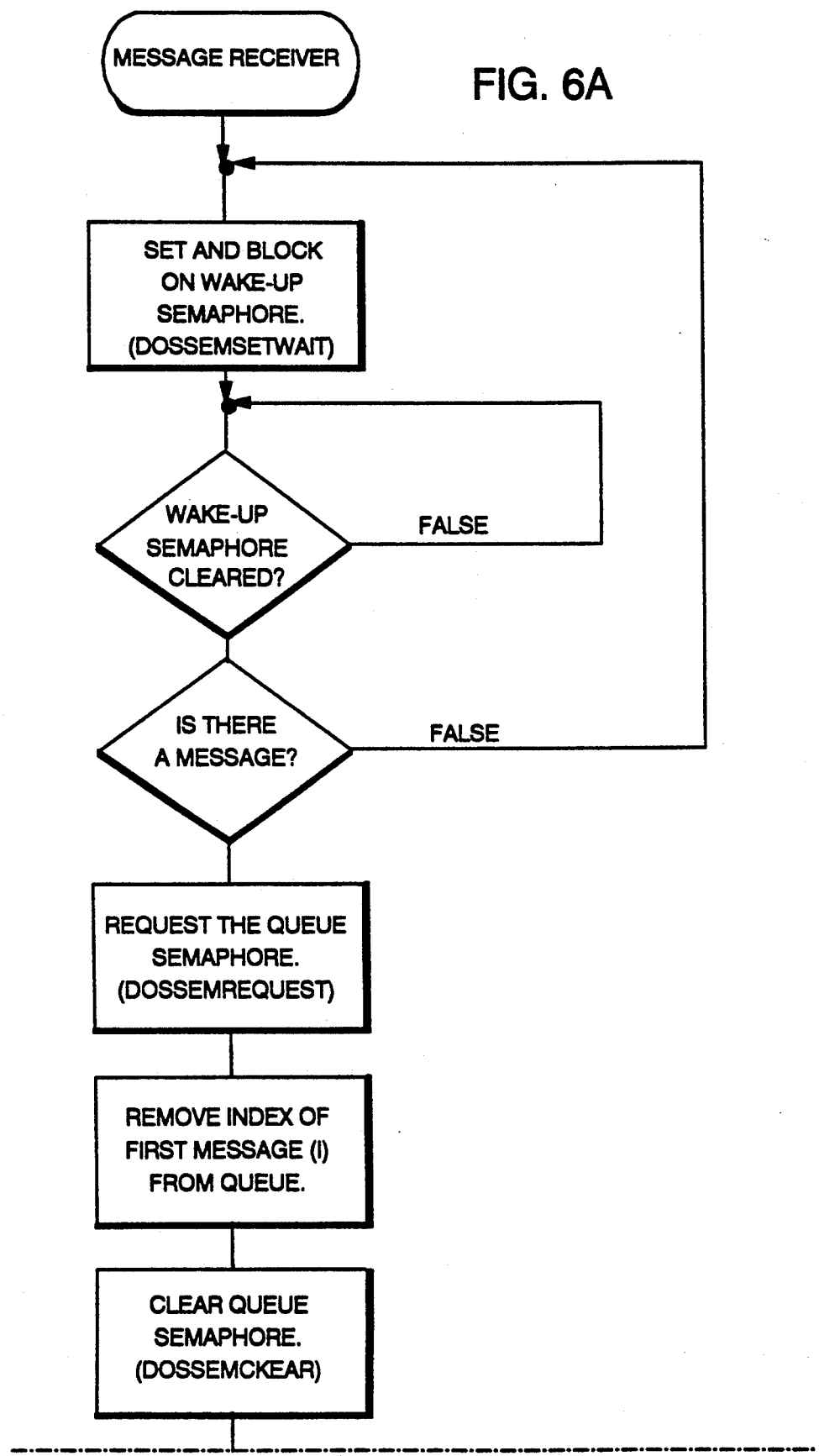

The steps described above which are performed by the cache manager 22 are illustrated in the flow diagram of FIG. 6. The cache manager sets and blocks on the wakeup semaphore. This is accomplished by issuing an operating system call (DOSSEMSETWAIT). It takes no action until the wakeup semaphore is cleared by the file system driver which indicates that a message is ready to be processed. The operating system call requesting the queue semaphore prevents overlap operation. The queue semaphore is cleared once the slot index is removed. After the message is processed clearing the slot semaphore causes the file system driver to complete its process.

While several embodiments of the invention have been described in detail, it will be obvious to those skilled in the art that changes and modifications can be made without departing from the spirit and scope of the invention described in detail above.

What is claimed is:

1. In a computer system having an operating system which supports shared memory and semaphores, a computer-implemented method for communicating a message from one program to another program both resident in the computer system including the following steps:

at one of said programs having a message to send to the other;

requesting a message semaphore from the operating system;

upon receiving the message semaphore from the operating system placing the message in a predetermined slot in the shared memory;

thereafter requesting a queue semaphore from the operating system;

upon receiving the queue semaphore from the operating system adding an indicia of the location of the said predetermined slot in the said shared memory in a queue located in the said shared memory; and, thereafter clearing the message and queue semaphores requested from the operating system and a wakeup semaphore which has been previously set by the other program whereby the other program is, upon the clearing of the wakeup semaphore, enabled to access the message in the predetermined slot in the shared memory.

2. The method set forth in claim 1 including the further steps:

at the said other program, setting the said wakeup semaphore upon completion of the processing of a previously received message, monitoring the wakeup semaphore and initiating the processing of a subsequently received message when the wakeup semaphore is cleared, including the following steps:

requesting the queue semaphore from the operating system and removing the first indicia in the queue indicating the location of the slot containing the subsequently received message in the shared memory;

clearing the queue semaphore;

obtaining the message in the slot corresponding to the indicia removed from the queue; and, setting the wakeup semaphore and inhibiting further processing of a subsequently received message until the wakeup semaphore is cleared.

3. The method set forth in claim 2 in which the message data is passed through the slot in the shared memory.

4. The method set forth in claim 2 in which information enabling the access to information contained elsewhere in the memory is passed through the slot in the shared memory.

5. The method set forth in claim 2 in which message data having a length equal to or less than a predetermined amount is passed through the slot in the shared memory; and, for message data having a length greater than the predetermined amount, information enabling access to the information contained elsewhere in the memory is passed through the slot in the shared memory.

6. The method as set forth in any one of claims 1 to 5 in which the two programs are operating at different privilege levels.

7. In a computer system having an operating system which supports shared memory and semaphores, a computer implemented method of exchanging messages between programs resident in the computer system including the following steps:

at one of said programs, having a message requiring a response to send to the other;

requesting a message semaphore from the operating system;

upon receiving the message semaphore from the operating system placing the message in a predetermined slot in the shared memory;

thereafter requesting a queue semaphore from the operating system;

upon receiving the queue semaphore adding an indicia of the location of the said predetermined slot in the said shared memory in a queue located in the said shared memory;

setting a slot semaphore in the shared memory which corresponds to the said predetermined slot;

clearing the message and queue semaphores, requested from the operating system, and a wakeup semaphore and inhibiting further message processing until the slot semaphore is reset;

monitoring the slot semaphore and processing a reply message in the said predetermined slot when the previously set slot semaphore is cleared; and, freeing the said predetermined slot once the message is processed;

at the said other program setting the said wakeup semaphore at initialization or upon completion of the processing of a received message, monitoring the wakeup semaphore and initiating the processing of a message when the wakeup semaphore is cleared, including the following steps;

requesting the queue semaphore from the operating system and removing the first indicia in the queue indicating the location of the slot containing a message in the shared memory;

clearing the queue semaphore;

getting the message using the indicia removed from the queue and process the message;

placing a reply in the slot corresponding to the slot indicia and clearing the corresponding slot semaphore; and, setting the wakeup semaphore and inhibiting further message processing until the wakeup semaphore has been cleared.

8. The method set forth in claim 7 in which the message data is passed through the slot in the shared memory.

9. The method set forth in claim 7 in which information enabling the access to information contained elsewhere in the memory is passed through the slot in the shared memory.

10. The method set forth in claim 7 in which message data having a length equal to or less than a predetermined amount is passed through the slot in the shared memory; and, for message data having a length greater than the predetermined amount, information enabling access to the information contained elsewhere in the memory is passed through the slot in the shared memory.

11. The method set forth in any one of claims 7 to 10 in which the two programs operate at different privilege levels.

* * * * *